United States Patent
Krasnanski et al.

(10) Patent No.: US 7,177,801 B2
(45) Date of Patent: Feb. 13, 2007

(54) SPEECH TRANSFER OVER PACKET NETWORKS USING VERY LOW DIGITAL DATA BANDWIDTHS

(75) Inventors: Kieth Krasnanski, Germantown, MD (US); Doug Wescott, Adamstown, MD (US); William Taboada, Olney, MD (US)

(73) Assignee: Texas Instruments Incorporated, Dallas, TX (US)

( * ) Notice: Subject to any disclaimer, the term of this patent is extended or adjusted under 35 U.S.C. 154(b) by 928 days.

(21) Appl. No.: 10/024,315

(22) Filed: Dec. 21, 2001

(65) Prior Publication Data

US 2003/0120489 A1    Jun. 26, 2003

(51) Int. Cl.
*G10L 19/00*    (2006.01)
(52) U.S. Cl. .................. 704/201; 704/235; 704/260
(58) Field of Classification Search .................. None
See application file for complete search history.

(56) References Cited

U.S. PATENT DOCUMENTS

| | | | | |
|---|---|---|---|---|
| 4,661,915 A | * | 4/1987 | Ott ........................... | 704/254 |
| 4,707,858 A | * | 11/1987 | Fette ........................ | 704/251 |
| 4,741,037 A | * | 4/1988 | Goldstern .................. | 704/226 |
| 4,975,957 A | * | 12/1990 | Ichikawa et al. ........... | 704/220 |
| 5,615,296 A | * | 3/1997 | Stanford et al. ......... | 704/270.1 |
| 5,960,389 A | | 9/1999 | Jarvinen et al. | |
| 5,987,405 A | * | 11/1999 | Bantz et al. ............... | 704/220 |
| 6,035,273 A | * | 3/2000 | Spies ........................ | 704/270 |
| 6,463,412 B1 | * | 10/2002 | Baumgartner et al. ...... | 704/246 |
| 6,502,073 B1 | * | 12/2002 | Guan et al. ................. | 704/255 |
| 6,832,189 B1 | * | 12/2004 | Kanevsky et al. .......... | 704/270 |
| 7,003,463 B1 | * | 2/2006 | Maes et al. .............. | 704/270.1 |

OTHER PUBLICATIONS

Glen Freundlich, Implementing Basic H.323, Sep. 1999, http://www.h323forum.org/papers, pp. 1-25.*
A Primer on the H.323 Series Standard, Databeam—Spring 1998, http://www.packetizer.com/voip/h323/papers/primer, 24 pages.*

* cited by examiner

*Primary Examiner*—David D. Knepper
(74) *Attorney, Agent, or Firm*—Steven A. Shaw; W. James Brady; Frederick J. Telecky, Jr.

(57) ABSTRACT

A method of communicating speech across a communication link using very low digital data bandwidth is disclosed, having the steps of: translating speech into text at a source terminal; communicating the text across the communication link to a destination terminal; and translating the text into reproduced speech at the destination terminal. In a preferred embodiment, a speech profile corresponding to the speaker is used to reproduce the speech at the destination terminal so that the reproduced speech more closely approximates the original speech of the speaker. A default voice profile is used to recreate speech when a user profile is unavailable. User specific profiles can be created during training prior to communication or can be created during communication from actual speech. The user profiles can be updated to improve accuracy of recognition and to enhance reproduction of speech. The updated user profiles are transmitted to the destination terminals as needed.

20 Claims, 4 Drawing Sheets

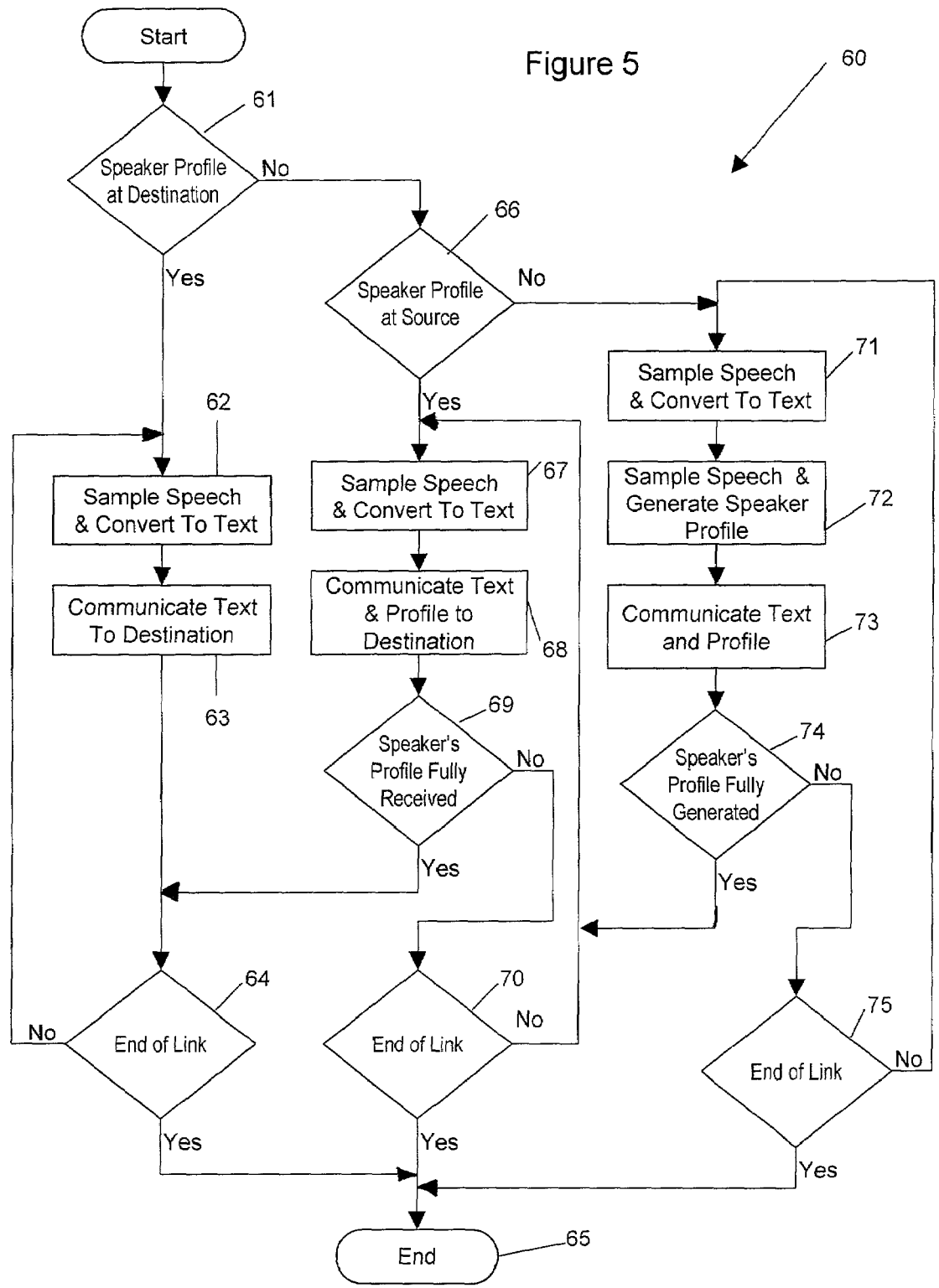

SPEECH TRANSFER OVER PACKET NETWORKS USING VERY LOW DIGITAL DATA BANDWIDTHS

REFERENCE TO RELATED APPLICATIONS

Not Applicable

FIELD OF THE INVENTION

The invention relates to the communication of speech over digital networks using very low data bandwidth. Specifically, the inventive method translates speech into text at a source terminal, communicates the text across the communication link to a destination terminal, and translates the text into reproduced speech at the destination terminal.

BACKGROUND OF THE INVENTION

Telephony communications are increasingly being communicated across digital networks. As a result, it is becoming increasingly desirable to communicate voice over these networks too. Presently, this is accomplished by using Voice over Packet (VoP) systems that compress the voice in accordance with an International Telecommunication Union (ITU) standard. After being conveyed across the digital network, the voice packets are decompressed and used to reproduce a signal at the destination terminal which attempts to closely match the original signal. This solution significantly reduces the required bandwidth while maintaining high voice quality. For example, an uncompressed voice signal requires a bandwidth of 64,000 bits per second (bps). A compressed version of this same voice signal may be communicated with as little as 8,000 bps while still preserving the toll quality of the telephone call.

Each compression of an audible signal, which reduces the necessary bandwidth, also reduces the resolution of the signal and causes some distortion. A substantial bandwidth reduction below 8,000 bps may not be possible using prior art methods, without greatly affecting the quality of the voice signal.

SUMMARY OF THE INVENTION

The inventive method uses voice recognition software to translate spoken words into digitally coded text. The text is transmitted over the digital network instead of the voice signal. When the text arrives at the destination terminal, it is converted back into speech by voice recognition software. The present invention provides a means to communicate a voice signal with as little as 140 bps.

In one embodiment, a default voice is used by the destination terminal to reproduce the spoken words. However, the destination terminal may have a database of the speaker's voice profile so that the reproduced voice sounds like the voice of the original speaker. If this database does not exist at the destination terminal, it is gradually transmitted to the destination terminal during the course of the telephone conversation. Once the speaker's voice profile is completely communicated, the voice profile used by the destination terminal transitions from the default profile to the speaker's profile.

A voice profile for a speaker is can be initially generated during training of the system or can be generated during one or more conversations. Training allows for voice recognition and allows the system to build a speaker voice profile which not only enables recognition but provides voice for more natural playback at the destination. The voice profile can be created by having the speaker read text provided by the voice recognition software prior to a telephone call or through recognition and correction of speech of the user during a conversation. The software may automatically create the voice profile during a telephone conversation and store and/or transmit it as it is generated or after completion. The voice profile for a user does not have to remain static after its initial creation, it can be improved and refined as the speaker uses the system and adds to the stored vocabulary and speech. At some level of use, the system can accommodate several alternative pronunciations of words to reflect different intonations or inflections of the speaker which can then be reproduced at the destination to enhance the conversation quality. The recognition software can select between the various intonations of the word to be reproduced based upon the recognition of the current pronunciation of the words in the speaker's present conversation.

The present invention teaches a method of communicating speech across a communication link using very low digital data bandwidth, having the steps of: translating speech into text at a source terminal; communicating the text across the communication link to a destination terminal; and translating the text into reproduced speech at the destination terminal. The primary advantage of this invention is the significant reduction of bandwidth it requires to communicate speech across a digital network and the elimination of distortion which can result from compression or packet loss.

BRIEF DESCRIPTION OF THE DRAWINGS

Preferred embodiments of the invention are discussed hereinafter in reference to the drawings, in which:

FIG. 5—illustrates an embodiment of the invention that creates the speaker's voice profile as the speaker communicates speech through a telephony link.

DETAILED DESCRIPTION OF THE INVENTION

Although a telephony link provides bi-directional communication between the users, the bi-directional link may be described as two separate links. These links are commonly referred to as the forward and reverse links. Each link has a communication medium that interconnects a source and a destination terminal. The source terminal communicates user speech to the destination terminal. Therefore, the source terminal for the forward link serves as the destination terminal for the reverse link.

Figure 1:
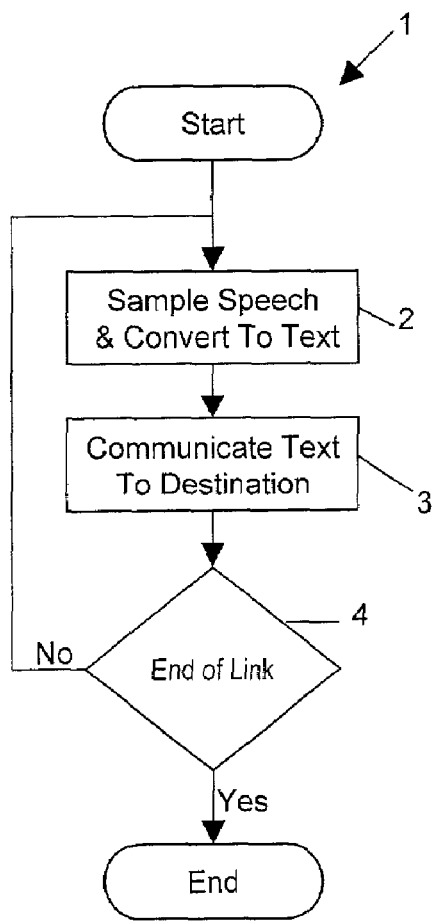
FIG. 1—illustrates a process flow executed by the source terminal of either one of two idealized unidirectional links of a bi-directional telephony link.
Figure 2:
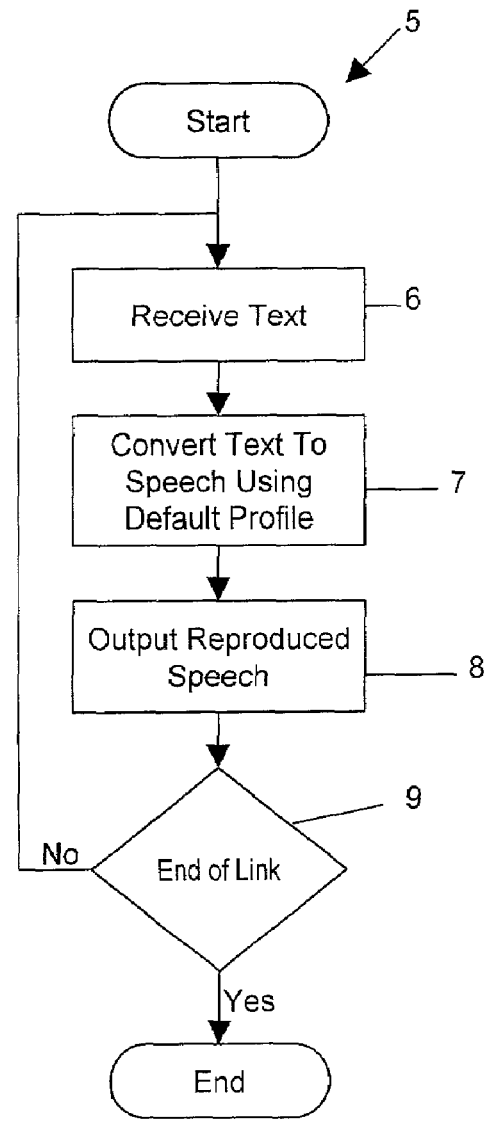
FIG. 2—illustrates a process flow executed by the destination terminal in association with the process flow of FIG. 1.

FIG. 1 illustrates a process flow 1 executed by the source terminal of either one of two unidirectional links of a bi-directional telephony link and FIG. 2 illustrates the associated process flow 5 executed by the destination terminal. As a user's speech is provided to the source terminal, portions of the speech are sampled and converted 2 to text by voice recognition software. Although throughout the disclosure the information about the content of the speech is described as text, it is not necessary that the speech be converted to text, as any symbolic representation of speech can be used. For instance, each word can be represented by a single digital code instead of a combination of codes which each represent a letter. The important aspect of the invention is that a representation of a word can be communicated with substantially less bandwidth than a digital encoding of the sound of the word.

The textual representation of the speech portion is digitally encoded and communicated 3 to the destination terminal. After each speech portion has been sampled, converted to text, and communicated to the destination terminal, the process 1 determines 4 whether the communication link has terminated. If the link is terminated, the process 1 ends. Otherwise, the process 1 samples the next consecutive portion of the speech and converts 2 this portion to text. The most recently converted text is communicated 3 to the destination terminal and the process 1, again, determines 4 whether the link has terminated. The sequence of converting 2 the next consecutive portion of the received speech to text and then communicating 3 the converted text to the destination unit is repeated until the link is terminated. Process 1 is begun anew when a link is established.

For the purpose of simplifying the description and process flowcharts, a link termination, as used in this disclosure, may be any form of momentary or permanent discontinuance of the speaker's speech or of the telephony link. For example, the link termination may be a pause in the speaker's conversation. In these instances, process 1 is renewed when the speaker's next vocal sound is uttered. In an exemplary embodiment, audio processing software can be used to distinguish between speech and background noise to identify pauses. or breaks in speech. Alternatively, the link termination may be the end of the telephony link and process 1 is not renewed until a new telephony link is established.

While the source terminal executes process 1, the destination terminal executes process 5. Process 5 begins by receiving 6 an individual portion of the communicated text from the source terminal. The received 6 portion of text is converted 7 to speech using the default speech profile of the destination terminal. The speech that is reproduced at the destination terminal has the vocal sound of the person whose voice served as the model for the speech profile, rather than the sound of the speaker. This reproduced speech is conveyed 8 to the listener before process 5 determines 9 whether the link has terminated. If the link has terminated, process 5 ends. Otherwise, the steps of the process 5 are re-executed for the next consecutive portion of text received from the source terminal. The sequence of receiving 6 the next portion of text, converting 7 the received text to speech, and outputting 8 the reproduced speech is repeated until the link terminates. Process 5 is renewed when a link is established.

Figure 3:
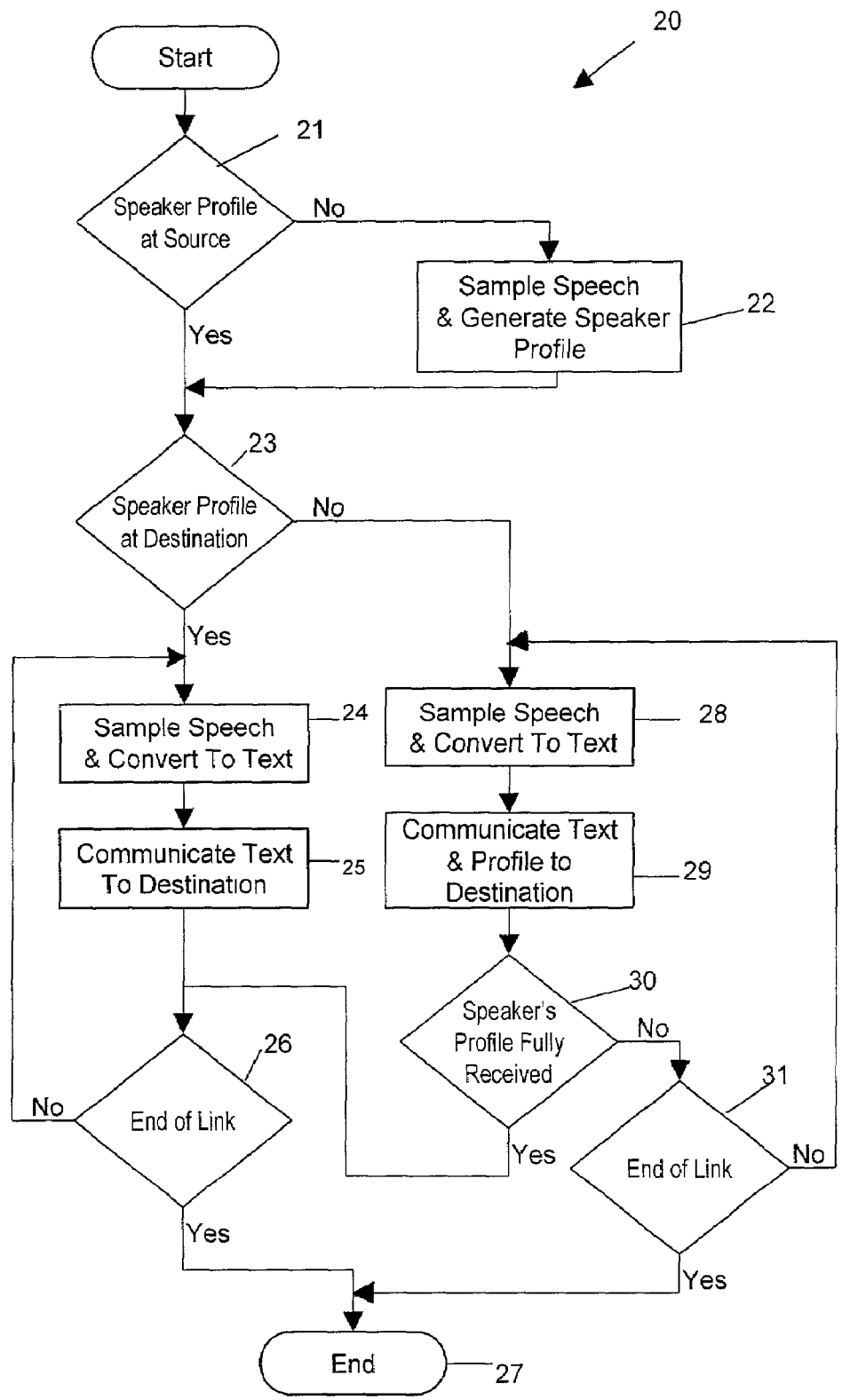
FIG. 3—illustrates a means for conveying the speaker's voice profile to the destination terminal so that the speech reproduced at the destination terminal sounds like the speech of the original speaker.

FIG. 3 illustrates an embodiment of the method that provides a means for conveying the speaker's own natural voice profile to the destination terminal so that the speech reproduced at the destination terminal sounds like the speech of the original speaker. Process 20 begins by determining 21 whether the speaker's voice profile exists at the source terminal. If the profile does not exist, it is created 22 by having the speaker read text provided by the voice recognition software before the link is established. Once the speaker's voice profile is created 22, it may be stored to memory and subsequently accessed without having to be re-created for every instance of an established link. The profile can also be periodically updated based on additional words spoken and stored as the system is used. Next, process 20 determines 23 whether the speaker's voice profile exists at the destination terminal. This determination may be made according to any known method. As an exemplary method, the source terminal conveys the profile identification to the destination terminal and the latter terminal responds with an indication of whether it has a copy of the profile.

If the destination terminal has a copy of the speaker's voice profile, process 20 repeatedly executes the same steps executed by process 1, in FIG. 1. First, a portion of the speech provided to the source terminal is sampled and converted 24 to text. Next, the text is communicated 25 to the destination terminal. Lastly, a determination 26 is made as to whether the link has terminated. If so, the process 20 ends. Otherwise, the sequence of converting 24 the next consecutive portion of the received speech to text and then communicating 25 the converted text to the destination unit is repeated until the link is terminated. Process 20 is begun again when a link is re-established.

If the destination terminal does not have a copy of the speaker's voice profile, as determined in step 23, process 20 communicates the voice profile to the destination terminal. Beginning with step 28, process 20 samples a portion of the speech and converts 28 it to text. Thereafter, the converted text and a portion of the speaker's voice profile are communicated 29 to the destination terminal. Next, a determination is made whether the speaker's voice profile has been completely communicated 30 to the destination terminal. If not, a determination 31 is made whether the link has terminated. Process 20 ends when the link is terminated. If the link has not terminated, then the next consecutive portion of the received speech is sampled and converted 28 to text. Both the converted text and the next remaining portion of the voice profile are communicated 29 to the destination terminal and another determination 30 is made whether the speaker's voice profile has been completely communicated to the destination terminal. Process steps 28–31 are repeated until either the link is terminated or the speaker's voice profile has been completely communicated to the destination terminal. If the link terminates before the voice profile is completely communicated, only the un-sent portion of the profile need be communicated when the link is re-established for this same speaker. Once a determination 30 is made that the voice profile has been completely communicated to the destination terminal, the flow of process 20 transfers to step 26 where a determination is made whether the link has terminated. For the remaining existence of the link, the converted text will be communicated to the destination terminal without a portion of the voice profile being sent also.

Figure 4:
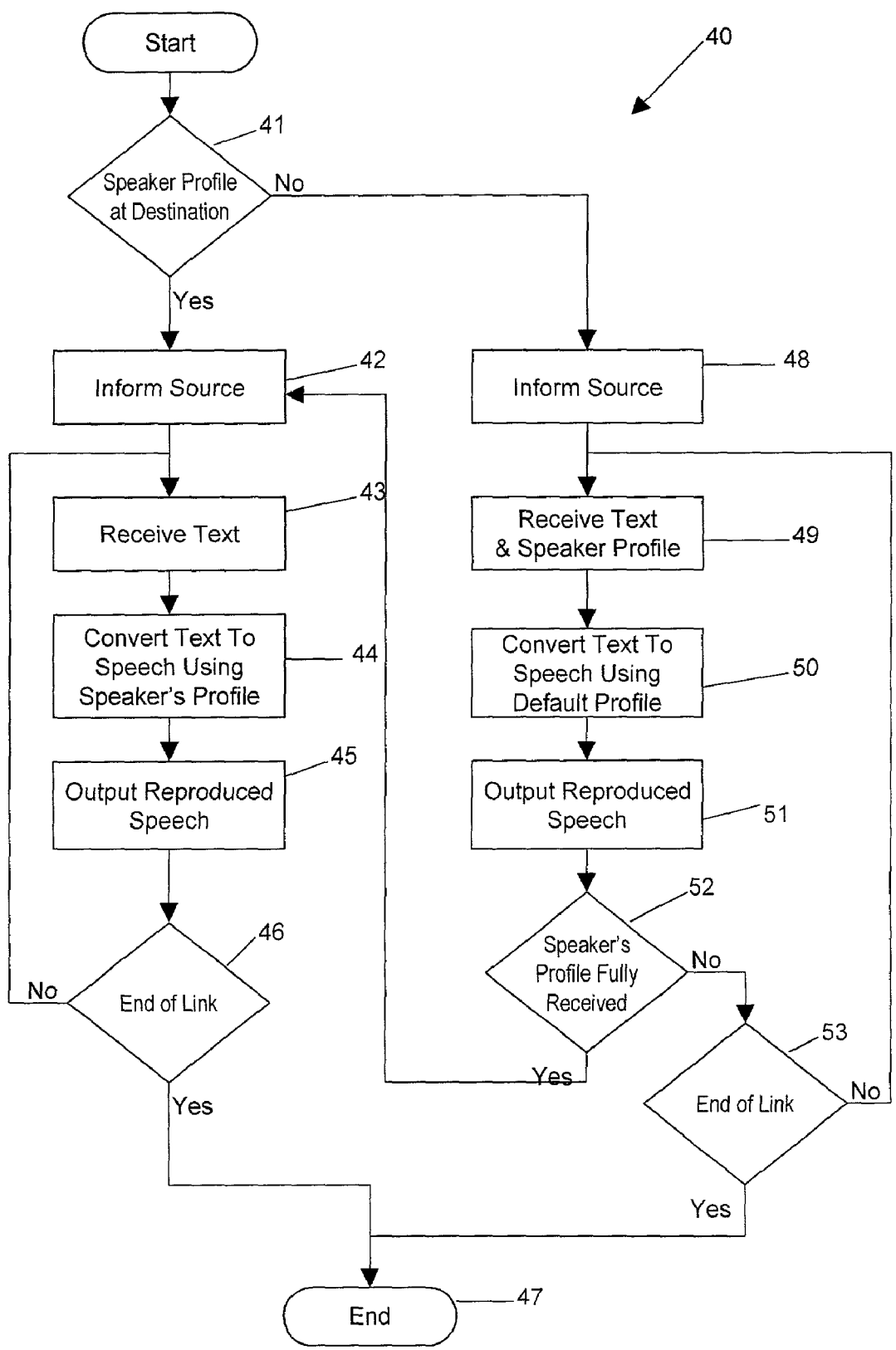
FIG. 4—illustrates the process executed by the destination terminal when the process of FIG. 3 is executed by the source terminal.

FIG. 4 illustrates the process 40 executed by the destination terminal when process 20, of FIG. 3, is executed by the source terminal. Process 40 begins by determining 41 whether the destination terminal has a copy of the speaker's voice profile. If so, the source terminal is informed 42 of this fact. Thereafter, the steps 43–46 of process 40 are nearly identical to steps 6–9 of process 5, which is illustrated in FIG. 2. First, the destination terminal receives 43 the text communicated to it by the source terminal. Then, the text is converted 44 to speech using the speaker's voice profile. The reproduced speech has the vocal characteristics of the original speaker when it is output 45 by the destination device. After each portion of the received text is converted into a reproduction of the original speech, a determination 46 is made whether the link has terminated. If so, process 40 ends. Otherwise, the next portion of text received from the source terminal is similarly received 43, converted 44 to speech using the speaker's voice profile, and output 45 as a reproduction of the original speech in the speaker's voice. Steps 43–45 are repeated until the link terminates.

If a determination is made in step 41 that the speaker's voice profile does not exist at the destination terminal, then the flow of process 40 transfers to the branch of steps comprising steps 48–53. In step 48, the destination terminal informs the source terminal that it does not have a copy of the speaker's voice profile. Next, the process repeatedly executes a set of steps 49–51 that is similar to the set of steps 6–8 in process 5 of FIG. 2. With regard to process 40, however, the destination terminal receives 49 not only the text communicated by the source terminal but also the communicated portion of the speaker's voice profile. The portion of the received voice profile is stored to memory by the destination device and the received text is converted 50 to speech using the default voice profile of the destination terminal. The reproduced speech has the voice characteristics of the person whose voice was used to model the voice profile, rather than the speaker's voice characteristics. As the text is converted to speech, it is conveyed 51 to the listener. Once the speech portion is output, a determination 52 is made whether the speaker's profile has been completely received from the source terminal. If so, all text subsequently received within the duration of the link will be converted to speech using the speaker's voice profile. Therefore, an affirmative determination in step 52 leads the process out of the branch of steps 49–53 and into the branch of steps 42–46, the destination terminal informs the source terminal that the profile has ben fully received and the speaker's voice profile is used for the speech conversion, steps 43–46.

If a determination is made in step 52 that the speaker's profile has not been fully received from the source terminal, then a determination 53 is made whether the link has terminated. If so, process 40 ends. Since the received portion of the speaker's voice profile has been stored to memory by the destination terminal, only the remaining portion of the profile need be communicated to the destination terminal when the link is re-established for the same speaker. If the link has not terminated, as determined in step 53, the sequence of steps 49–51 is repeated until either the speaker's voice profile is completely received or the link terminates. This sequence comprises receiving the communicated text and speaker profile portions 49, storing the received portion of the speaker profile to memory, converting the received text to speech 50 using the default voice profile, and outputting the reproduced speech 51.

FIG. 5 illustrates an embodiment of the invention that creates the speaker's voice profile as the speaker communicates speech through the link. Process 60 begins by determining 61 whether the speaker's voice profile exists at the destination terminal. If the voice profile exists at the destination terminal, a portion of the incoming speech provided by the speaker is sampled and converted 62 to text by voice recognition software. The converted text is communicated to the destination terminal before a determination 54 is made whether the link has terminated. If the link has terminated, process 60 ends. If the link has not terminated, the next consecutive portion of the speaker's incoming speech is sampled and converted 62 to text. Again, the converted text is communicated 63 to the destination terminal before a determination 64 is made whether the link has terminated. This sequence of sampling and converting 62 to text the next consecutive portion of incoming speech, communicating 63 the converted text, and determining 64 whether the link has terminated is repeated until the link terminates.

If a determination is made that the destination device does not have a copy of the speaker's voice profile in step 61, a determination 66 is made whether the source terminal has a copy of the profile. If so, process 60 executes a branch of steps 67–70, to communicate the speaker's voice profile, that is nearly identical to the branch of steps 28–31 in process 20, as illustrated in FIG. 3. Process 60 samples a portion of the speaker's incoming speech and converts 67 it to text. Thereafter, the converted text and a portion of the speaker's voice profile are communicated 68 to the destination terminal. Next, a determination is made whether the speaker's voice profile has been completely communicated 69 to the destination terminal. If not, a determination 70 is made whether the link has terminated. Process 60 ends when the link is terminated. If the link has not terminated, then the next consecutive portion of the speaker's incoming speech is sampled and converted 67 to text. Both the converted text and the next remaining portion of the voice profile are communicated 68 to the destination terminal and another determination 69 is made whether the speaker's voice profile has been completely communicated to the destination terminal. Process 60 steps 67–70 are repeated until either the link is terminated or the speaker's voice profile has been completely communicated to the destination terminal. If the link terminates before the voice profile is completely communicated, only the portions of the profile that were not communicated will be communicated when the link is re-established for this same speaker. Once a determination 69 is made that the voice profile has been completely communicated to the destination terminal, the flow of process 60 transfers to step 64 where a determination is made whether the link has terminated. For the remaining period of the link, the converted text will be communicated to the destination terminal without a portion of the voice profile being sent along with it.

If the speaker's voice profile does not exist at the destination terminal, as determined by step 66, steps 71–75 are repeatedly executed until either the speaker's profile has been created and completely communicated to the destination terminal or the link is terminated. Beginning with step 71, a portion of the speaker's speech is sampled and converted 71 to text by voice recognition software. The sampled portion of the speech is also used by the voice recognition software to generate 72 the speaker's voice profile. Both the converted text and any portion of the voice profile available for conveyance are communicated 73 to the destination terminal. It is not necessary to convey portions of the speaker profile as they are created to be within the scope of the invention. It may be advantageous in some implementations to delay transmission until the speaker's profile is developed to a certain extent or until it is fully developed.

Next, a determination 74 is made whether the speaker's voice profile has been completely generated based upon the voice sampling. If so, no further generation of the speaker's voice profile will be made, for the remaining period of the communication link. The process 60 flow branches to step 69 for a determination of whether the speaker's profile has been fully received at the destination. If the speaker profile has been completely received, the process flows through blocks 67–70. Once the profile is fully received, process 60 repeatedly samples and converts 62 the next incoming portion of the speaker's incoming speech to text, communicates 63 the converted text to the destination terminal, and re-evaluates 64 whether the link has terminated.

If a negative determination is made in step 74 as to whether the speaker's voice profile has been completely communicated, a determination 75 is made whether the link has terminated. If so, process 60 is terminated. Any portion of the speaker's voice profile that was not completely generated 72 and communicated 73 to the destination terminal prior to a link termination may be generated and communicated when the next link between these source and destination terminals is established for this speaker. If a negative determination is made in step 75 regarding the termination of the link, the next consecutive portion of the speaker's incoming speech is sampled and converted 71 to text. This next sample is used to continue generating 72 the speaker's voice profile. The available converted text and portion of the generated 72 voice profile are communicated 73 to the destination terminal before another determination is made whether the voice profile has been completely generated. The sequence of sampling the next consecutive portion of the speaker's incoming speech and converting 71 it to text, continuing the generation 72 of the speaker's voice profile, and communicating 73 the converted text and the additional voice profile information is repeated until either the link is terminated or the speaker's voice profile has been completely generated.

FIG. 4 illustrates the process 40 executed by the destination terminal when process 60, of FIG. 5, is executed by the source terminal. The same process 40 is executed by the destination terminal when either of processes 20 or 60 are executed by the source terminal.

The speaker's profile may be periodically updated as use of the system will add words, phrases, proper names, inflections intonations and the like to the database of the user. The updated profile can be used by the source terminal to increase the accuracy of speech recognition. Further, the updated profile can be periodically transmitted to the destination terminal to update a previously transmitted speaker profile to allow for enhanced playback. Updating can take place during a subsequent conversation between the source and destination terminals or can take place as part of a separate transfer connection.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method of speech communication using very low digital data bandwidth, comprising:
   providing a bi-directional digital telephony link over a digital packet network between a source terminal and a destination terminal,
   wherein the source terminal for a forward link serves as the destination terminal for a reverse link on the digital telephony link;
   distinguishing between speech and a pause in the speech communication using an ITU voice activity detection module;
   providing a comfort noise simulation of background noise for each distinguished pause in the speech communication in time order with the speech;
   translating said speech into text at the source terminal;
   communicating said text and said time-ordered simulated comfort noise of each pause in speech across the bi-directional digital telephony link to the destination terminal;
   determining a status of the telephony link;
   ending the communicating if the telephony link is terminated;
   generating a speaker voice profile by training the source terminal to recognize words spoken by a speaker for reproduction of audible speech corresponding to words spoken by the speaker having audible qualities approximating that of the speaker;
   communicating the voice profile across the telephony link from the source terminal to the destination terminal,
   wherein the speaker's voice profile contains the information needed to generate the reproduced speech that substantially resembles the sound of the speaker's voice; and
   translating said text into reproduced speech received at said destination terminal using the speaker's voice profile and reproducing the simulated background noise in the reproduced speech in time order with each pause in the speech at the source terminal at the destination terminal.

2. The method of claim 1, further comprising the step of:
   generating said reproduced speech using a default voice profile.

3. The method of claim 1, further comprising the step of:
   generating said reproduced speech using a speaker's voice profile at said destination terminal, wherein said speaker's voice profile contains the information needed to generate said reproduced speech that substantially resembles the sound of said speaker's voice.

4. The method of claim 3, further comprising the steps of:
   generating said reproduced speech using a default voice profile of said destination terminal, until said speaker's voice profile has been communicated across said communication link; and
   generating said reproduced speech using said speaker's voice profile at said destination terminal, after said speaker's voice profile has been communicated across said communication link.

5. The method of claim 1, wherein:
   a portion of said training is performed during a portion of the time said speaker is communicating speech across said communication link.

6. The method of claim 5, wherein:
   said speaker's voice profile is periodically updated as said speaker uses said method, and
   said updated profile is periodically communicated to said destination terminal.

7. The method of claim 1, wherein the translating said speech into text comprises translating the speech into digitally coded symbols.

8. The method of claim 1, wherein the translating said speech into text comprises translating the speech into digitally coded characters.

9. The method of claim 1, further comprising:
   after the ending of the communicating, determining if the telephony link is re-connected; and
   continuing the communicating when the determining indicates that the telephony link is re-connected.

10. A method of communicating speech for a telephone conversation across a bi-directional communication link using very low digital data bandwidth, comprising:
    providing a bi-directional digital telephony link over a digital network between a source terminal and a destination terminal,
    wherein the source terminal for a forward link serves as the destination terminal for a reverse link on the digital telephony link;

distinguishing between a first speaker's speech and a pause in the speech communication of the first speaker using an ITU voice activity detection module;

providing a comfort noise simulation of background noise for each distinguished pause in speech in the speech communication of the first speaker in time order with the first sneaker's speech;

translating a first speaker's speech into first text characters at the source terminal;

communicating, from the source terminal, said first text characters and said time-ordered simulated comfort noise of each pause in the first speaker's speech across the digital telephony link to the destination terminal;

determining, from the source terminal, whether the bi-directional digital telephony link has terminated, and if the digital telephony link has terminated then ending the translating and the communicating from the source terminal;

translating said first text characters into first reproduced speech and reproducing the simulated background noise in the reproduced speech of the first speaker in time order with each pause in the speech at the source terminal at the destination terminal;

distinguishing between a second speaker's speech and a pause in the speech communication of the second speaker using an ITU voice activity detection module;

providing a comfort noise simulation of background noise for each distinguished pause in speech in the speech communication of the second speaker in time order with the second speaker's speech;

translating a second speaker's speech into second text characters at the destination terminal;

communicating said second text characters and said time-ordered simulated comfort noise of each pause in the second speaker's speech across the digital telephony link to the source terminal;

determining, from the destination terminal, whether the bi-directional digital telephony link has terminated, and if the digital telephony link has terminated then ending the translating and the communicating from the destination terminal; and translating said second text characters into second reproduced speech and reproducing the simulated background noise in the reproduced speech of the second speaker in time order with each pause in the speech at the source terminal at the source terminal.

11. The method of claim 10, further comprising:

providing the source terminal with a first voice profile of said first speaker; and providing the destination terminal with a second voice profile of said second speaker;

communicating said first voice profile across said bi-directional digital telephony link to the destination terminal; and communicating said second voice profile across said bi-directional digital telephony link to said first terminal;

generating said first reproduced speech using said first speaker's voice profile at the destination terminal;

generating said second reproduced speech using said second speaker's voice profile at the source terminal, wherein said first speaker's voice profile contains the information needed to generate said first reproduced speech that substantially resembles the sound of said first speaker's voice, and said second speaker's voice profile contains the information needed to generate said second reproduced speech that substantially resembles the sound of said second speaker's voice.

12. The method of claim 11, further comprising:

generating said first reproduced speech using a default voice profile of the destination terminal, until said first speaker's voice profile has been communicated across the digital telephony link;

generating said second reproduced speech using a default voice profile of the source terminal, until said second speaker's voice profile has been communicated across the digital telephony link;

generating said first reproduced speech using said first speaker's voice profile at said second terminal, after said first speaker's voice profile has been communicated across the digital telephony link; and generating said second reproduced speech using said second speaker's voice profile at the source terminal, after said second speaker's voice profile has been communicated across the digital telephony link.

13. The method of claim 12, wherein:

said first text and said first speaker's voice profile are simultaneously communicated across the digital telephony link; and said second text and second speaker's voice profile are simultaneously communicated across the digital telephony link.

14. The method of claim 12, wherein:

said first speaker's voice profile is provided by first training at the source terminal; and said second speaker's voice profile is provided by second training at the destination terminal, and wherein said first training comprises said first speaker speaking a number of words, which can be pre-determined words, expected words, or unexpected but recognized words, and said second training comprises said second speaker speaking a number of words, which can be pre-determined words, expected words, or unexpected but recognized words.

15. The method of claim 10, wherein the translating the first speaker's speech into the first text characters comprises translating the first speaker's speech into first digitally coded symbols representing the first text characters, and the translating the second speaker's speech into the second text characters comprises translating the second speaker's speech into second digitally coded symbols representing the second text characters.

16. The method of claim 10, wherein the translating the first speaker's speech into the first text comprises translating the first speaker's speech into first digitally coded symbols representing the first text characters, and the translating the second speaker's speech into the second text characters comprises translating the second speaker's speech into second digitally coded symbols representing the second text characters.

17. A system of communicating speech using very low digital data bandwidth, comprising:

a digital packet network;

a source terminal and a destination terminal operatively connected over the packet network on bi-directional digital telephony link;

wherein the source terminal for a forward link serves as the destination terminal for a reverse link on the digital telephony link;

wherein the source terminal:

distinguishes between speech and a pause in the speech communication using an ITU voice activity detection module;

provides a comfort noise simulation of background noise for each distinguished pause in the speech communication in time order with the speech, translates speech into text, communicates the text and the time-ordered simulated comfort noise of each pause in speech across the bi-directional digital telephony link to the destination terminal, determines a status of the telephony link, ends the communication if the telephony link is terminated, generates a voice profile by recognizing words spoken by a speaker for reproduction of audible speech corresponding to words spoken by the speaker having audible qualities approximating that of the speaker, and communicates the voice profile across the telephony link to the destination terminal, and wherein the speaker's voice profile contains the information needed to generate the reproduced speech that substantially resembles the sound of the speaker's voice; and wherein the destination terminal translates the text into reproduced speech using the speaker's voice profile and reproduces the simulated background noise in the reproduced speech in time order with each pause in the speech at the source terminal at the destination terminal.

18. The method of claim 17, wherein the source terminal translates said speech into text as digitally coded symbols.

19. The method of claim 17, wherein the source terminal translates said speech into text as digitally coded characters.

20. The method of claim 17, further comprising:

wherein, after the source terminal communicates the text the source terminal determines if the telephony link is re-connected, and upon detection of re-connection of the telephony link, continues to communicate the text to the destination terminal.

* * * * *

UNITED STATES PATENT AND TRADEMARK OFFICE
CERTIFICATE OF CORRECTION

PATENT NO. : 7,177,801 B2 Page 1 of 1
APPLICATION NO. : 10/024315
DATED : February 13, 2007
INVENTOR(S) : Keith Krasnansky, Doug Wescott and William Taboada It is certified that error appears in the above-identified patent and that said Letters Patent is hereby corrected as shown below:

Title Page
(75) Inventors: "Kieth Krasnanski" should be --Keith Krasnansky-- as noted on the declaration that is included.

Signed and Sealed this

Twenty-fourth Day of April, 2007

JON W. DUDAS
*Director of the United States Patent and Trademark Office*